US006670033B1

(12) United States Patent
Hubbard et al.

(10) Patent No.: US 6,670,033 B1
(45) Date of Patent: Dec. 30, 2003

(54) PROCESS AND PRODUCTS OF PURIFICATION OF ANHYDROSUGAR ALCOHOLS

(75) Inventors: Michael A. Hubbard, Pittsford, NY (US); Michael Wohlers, Eschborn (DE); Helmut B. Witteler, Beindersheim (DE); Edward G. Zey, Corpus Christi, TX (US); George Kvakovszky, Slidell, LA (US); Thomas H. Shockley, Corpus Christi, TX (US); Larry F. Charbonneau, Mendham, NJ (US); Norbert Kohle, Florsheim (DE); Jochen Rieth, Selters (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/857,574
(22) PCT Filed: Jan. 11, 1999
(86) PCT No.: PCT/US99/00539
§ 371 (c)(1),
(2), (4) Date: Nov. 27, 2001
(87) PCT Pub. No.: WO00/41985
PCT Pub. Date: Jul. 20, 2000

(51) Int. Cl.[7] ............... D02G 3/00; C08G 63/66
(52) U.S. Cl. ............ 428/364; 528/275; 528/300; 528/302; 528/307; 528/308; 528/308.6; 528/403; 528/499; 428/357; 430/321
(58) Field of Search ............... 528/275, 300, 528/302, 307, 308, 308.6, 403, 499; 428/357, 364; 430/321

(56) References Cited

U.S. PATENT DOCUMENTS

| | | | | |
|---|---|---|---|---|
| 3,160,641 A | * | 12/1964 | Hartmann | 549/464 |
| 4,408,061 A | * | 10/1983 | Salzburg et al. | 549/464 |
| 4,564,692 A | * | 1/1986 | Feldmann et al. | 549/464 |
| 6,407,266 B2 | * | 6/2002 | Bhatia | 549/464 |

* cited by examiner

Primary Examiner—Samuel A. Acquah

(57) ABSTRACT

A process for the formation of a purified anhydrosugar alcohol is disclosed, whereby the resultant purified anhydrosugar alcohol has a purity of at least 99.8% and is substantially colorless. The anhydrosugar alcohol is purified by distillation, recrystallization from methanol, ethanol or ethylene glycol, melt recrystallization, or a combination thereof. Preferably, the purification is by distillation followed by recrystallization from methanol, ethanol or ethylene glycol. A test for determining the purity of the anhydrosugar alcohol is disclosed, wherein the color of the anhydrosugar alcohol after annealing at a temperature of at least 260° C. for at least four hours is examined. Alternatively, purity can be determined by examination of ultraviolet (UV) transmittance of the purified anhydrosugar alcohol at various wavelengths. The purified anhydrosugar alcohol may be incorporated into a polymer such as a polyester, which may in turn be used to form such articles of manufacturing as containers, optical disks, fibers, sheets and films.

28 Claims, No Drawings

US 6,670,033 B1

PROCESS AND PRODUCTS OF PURIFICATION OF ANHYDROSUGAR ALCOHOLS

RELATED APPLICATIONS

The following application Ser. No. 09/786,716 filed on even date herewith, contains related subject matter: CONTINUOUS PROCESS FOR THE PRODUCTION OF ANHYDROSUGAR ALCOHOLS. The subject matter of the above-mentioned application is hereby incorporated by reference.

FIELD OF THE DISCLOSURE

The present disclosure relates to a process for the purification of anhydrosugar alcohols by distillation and/or recrystallization in the presence of an aliphatic alcohol, and the products of the purification, which are desirably greater than 99.0% pure and, even upon thermal treatment, are substantially colorless.

BACKGROUND OF THE DISCLOSURE

Anhydrosugar alcohols, in particular derivatives of mannitol, iditol, and sorbitol, are known for their therapeutic uses and uses in food. Further, at least isosorbide, 1,4:3,6-dianhydrosorbitol, is being examined as a renewable natural resource for the manufacture of polymers, especially polyesters, because isosorbide is a derivative of sorbitol, which can be derived from various natural resources, including corn starch and cassava (tapioca). See related applications on processes of making and products made from polymers having isosorbide, terephthaloyl and ethylene glycol moieties, U.S. patent applications Ser. Nos. 09/064,844; 09/064,950; 09/064,846; 09/064,858; 09/064,826; 09/064,719; 09/064,862; and 09/064,720, all filed Apr. 23, 1998, each of which are incorporated in their entirety by reference.

The purity requirements for the use of anhydrosugar alcohols differ depending upon the intended application. In food and drug applications, for example, one requirement is that there be no impurities that cause harm to the individual or organism using the material containing the anhydrosugar alcohol. By this definition, an anhydosugar alcohol may contain numerous other materials or impurities that are not anhydrosugar alcohols and yet still be considered pure for a food or drug application. In polymer applications, especially those that require optical clarity, such as polymers used in packaging, one monomer purity requirement is that there not be any materials or impurities present in the monomer that could cause the resultant polymer to develop an unacceptable degree of color during synthesis and/or processing. Impurities that may be permissible in anhydrosugar alcohols used for food and drug applications may not in fact be acceptable for anhydrosugar alcohols that are to be used in polymer applications because those impurities may lead to the development of an unacceptable level of color during the synthesis or processing of the polymer.

Several methods of purifying anhydrosugar alcohols are known in the art. For example, such alcohols can be purified by vacuum distillation or recrystallization from an organic solvent such as ethyl acetate and/or ether, as disclosed in Flèche and Huchette, "Isosorbide: Preparation, Properties and Chemistry," starch/stärke 38 (1986) Nr. 1, pp. 26–30 at 29, or methyl ethyl. ketone as disclosed in U.S. Pat. No. 3,454,603. However, these methods do not sufficiently remove impurities that may lead to the development of an unacceptable level of color during polymer synthesis and/or processing.

Purification by recrystallization from water is also known, as disclosed in Beck, "Dianhydrosorbitol—a new pharmaceutical ingredient," *Pharmaceutical Manufacturing International*, p.97–100 at 97–98 (1996), although the product resulting from this is only about 97% pure. Generally, water is undesirable as a solvent because anhydrosugars are extremely hygroscopic.

Purification by distillation under reduced pressure in the presence of borohydride ions has also been proposed, as disclosed by Flèche and Huchette, p. 29, and as described in U.S. Pat. No. 3,160,641 for the reduction of periodate-consuming impurities in isosorbide using boric acid.

Methods are also known for the purification of anhydrosugar alcohol derivatives, and for purification of anhydrosugar alcohol precursors. Purification of specific anhydrosugar alcohol derivatives by recrystallization from methanol and ethanol is demonstrated in, for example, Hockett et al. *J. Am. Chem. Soc.*, Vol. 68, p.930–935 (1946); Copeand Shen, *J. Am. Chem. Soc.* p.3177–3182 (1956); and Ojrzanowski et al., *Acta Pol. Pharm.* 43(6) p.567–71 (1986).

Further, purification of precursors such as D-mannitol and D-glucitol by extraction or recrystallization from ethanol or a mixture of ethanol and water, respectively, are demonstrated by Block et al. in *Acta Chem. Scan.* (43) p.264–268 (1989).

The use of methanol and ethanol in the recrystallization of precursors and derivatives of anhydrosugar alcohols is also demonstrated by Defaye et al., *Carb. Res.* 205 p.191–202 (1990). Defaye et al. also demonstrates recrystallization of A dianhydrosugar alcohols, specifically, 1,4:3,6-dianhydro-D-mannitol and 1,4:3,6-dianhydro-D-glucitol. However, these recrystallizations do not use aliphatic alcohols such as methanol, ethanol or ethylene glycol as solvents.

A method of purification of monoanhydrohexitols and dianhydrohexitols is also set forth in U.S. Pat. No. 4,564,692 to Feldmann et al. However, this process requires placing the anhydrosugar alcohol in a heavy liquid having 1–20% water by weight and adding seed crystals of the desired anhydrosugar alcohol to be recrystallized.

There is no known teaching of purifying an anhydrosugar alcohol by recrystallization from aliphatic alcohols such as methanol, ethanol or ethylene glycol. The above processes, as known in the art, are directed to purification of the anhydrosugar alcohol for use in food or pharmaceutical compositions. The inventors herein are unaware of any previous purification process achieving the required level of purity for use in polymers.

In view of the above, a simple and cost effective method of purifying anhydrosugar alcohols, resulting in an extremely pure product, is desired. Further, an extremely pure anhydrosugar alcohol is desired, particularly for use in polymer formation.

SUMMARY OF THE DISCLOSURE

The inventors of the present disclosure have discovered that recrystallization from lower aliphatic alcohols, such as methanol and ethanol, as well as melt recrystallization, improves the purity and clarity of color of anhydrosugar alcohols. Distillation also improves the purity of the end product, and may optionally be done over sodium borohydride ($NaBH_4$) or other hydride ion containing compounds. A combination of distillation and solvent or melt recrystallization markedly improves the purity of the end product. Similarly, multiple distillations and/or multiple recrystallizations from lower aliphatic alcohols have been found to markedly increase the purity of the anhydrosugar alcohol.

Further, it is disclosed herein that the purity of the anhydrosugar alcohols is best measured with regard to the relative color of the anhydrosugar alcohol and its ultraviolet (LN) transmittance. A method for obtaining such measurements is herein disclosed.

Also, a method of determining the quality of polymers prepared with the purified anhydrosugar alcohol is disclosed, wherein the anhydrosugar alcohol is annealed at temperatures approaching those used in polymer formation, thereby testing the development of color in the annealed anhydrosugar alcohol at the elevated temperatures necessary for the formation of polymers. The coloring of the resultant annealed anhydrosugar alcohol is indicative of the color that may develop during synthesis and/or processing of the resultant polymer.

Further, use of the purified anhydrosugar alcohols resulting from the above methods in the formation of polymers and products formed therefrom is described.

DETAILED DESCRIPTION OF THE PREFERRED EMBODIMENTS OF THE DISCLOSURE

The process of the invention provides for the purification of anhydrosugar alcohols, whether starting with a commercially available product, or working with a product derived directly from a batch or continuous process for formation of anhydrosugar alcohols.

In the process of the invention, the anhydrosugar alcohol is purified by distillation and/or recrystallization from lower aliphatic alcohols. By "lower aliphatic alcohols" it is meant linear aliphatic alcohols, preferably having 1–4 carbons. Most desirably, the alcohols are methanol, ethanol or ethylene glycol. The resulting purified anhydrosugar alcohol is at least 99.0% pure, or free from contaminants, and is preferably colorless.

The anhydrosugar alcohols of the invention are monoanhydro- or dianhydrosugar alcohols. Desirable dianhydrosugar alcohols include isosorbide, isomannide and isoidide. Preferably, the anhydrosugar alcohol of the invention is isosorbide.

Distillation of anhydrosugar alcohols can be performed with or without hydride ion containing compounds, such as borohydride ion containing compounds like $NaBH_4$, or lithium aluminum hydride. In a preferred embodiment, distillation occurs by placing the anhydrosugar alcohol in a flask and subjecting the flask to vacuum distillation at a temperature of at least 60° C., preferably at least 70° C., most preferably at least 80° C. The anhydrosugar alcohol is kept at this temperature until the distillation of all volatile impurities is complete. The flask is then preferably purged with a non-reactive gas, such as nitrogen or argon. A hydride ion containing compound, preferably a borohydride ion containing compound, most preferably $NaBH_4$, may optionally be added to the anhydrosugar alcohol in the flask at this time. The flask is then heated to a temperature of at least 100° C., preferably at least 120° C., most preferably at least 140° C., before evacuation to approximately 1 mbar pressure under vacuum and subsequent distillation. The anhydrosugar is then distilled in vacuo. Preferably, the distillation is performed in an apparatus equipped with a short distillation column. The distilled anhydrosugar alcohol is preferably further purified by one or more additional distillations and/or recrystallizations.

For recrystallization from solution according to the invention herein, the. anhydrosugar alcohol may be placed in a solution of aliphatic alcohols, preferably methanol, ethanol or ethylene glycol. The temperature of the solution is lowered to less than 30° C., preferably less than 10° C., more preferably less than 0° C., and most preferably less than −10° C., until recrystallization is complete, usually a period of at least 4 hours. The resultant crystals are collected by filtration and washed with the cold aliphatic alcohol, preferably at or below the temperature of crystallization so as not to dissolve the crystals. The crystals may optionally be dried in vacuo at room temperature. Further recrystallizations from aliphatic alcohols and/or distillations may be performed.

Alternatively, melt recrystallizations of the anhydrosugar alcohol may be performed. Melt recrystallization may be done by any means known in the art and may be performed before or after distillation, or in place of distillation and recrystallization from solution. Typically, melt recrystallization entails heating a compound in the absence of solvent just beyond its melting point, then slowly cooling the molten compound to cause formation of purified crystals of the compound. The purities generally form a liquid surrounding the purified crystals and have a lower melting point than the crystals.

The anhydrosugar alcohol obtained by the above described methods has a purity of at least 99.0%, preferably at least 99.5%, and most preferably at least 99.8%. This level of purity is desirably obtained by no more than three distillations, three recrystallizations from aliphatic alcohol, three melt recrystallizations, or a combination of no more than three of the above described purification methods.

The above methods of purifying the anhydrosugar alcohol may be applied to a batch process. They are also applicable to a continuous process of manufacturing anhydrosugar alcohols with modification as known to one of ordinary skill in the art, as discussed in the copending application, filed this same day herewith, titled CONTINUOUS PROCESS FOR THE PRODUCTION OF ANHYDROSUGAR ALCOHOLS, which is incorporated herein in its entirety.

The formation of anhydrosugar alcohols isolated from a continuous process is driven by the reaction mechanisms of the continuous process. Therefore, yield may be somewhat lower in a continuous process purification than if the purification step were optimized as a separate reaction, or in a batch process. In particular, distillation and/or recrystallization from a continuous process begins with separation of the anhydrosugar alcohol from the solvent of the continuous process. This can, for example, be achieved by direct recrystallization of the anhydrosugar alcohol from the solvent used in the continuous process. Thus, the anhydrosugar alcohol is obtained as a solid. Another means of separating the anhydrosugar alcohol from the solvent of the continuous process is liquid-liquid extraction using water or an aliphatic alcohol such as methanol, ethanol or ethylene glycol. The anhydrosugar alcohol is thus obtained as a solution in water, methanol, ethanol or ethylene glycol. The separated anhydrosugar alcohol is then further purified as discussed above, by distillation and/or recrystallization. This leads to a reaction product with superior purity compared to other processes, and provides a more economical process for the formation of purified anhydrosugar alcohols.

The purity of the anhydrosugar alcohol obtained by distillation and/or recrystallization can be measured by conventional means such as differential scanning calorimetry (DSC), wherein the measurements are taken in accordance with ASTM E 928-96. However, a simpler and very accurate measure of the purity of the anhydrosugar alcohol for use in polymer applications requiring optical clarity can be made by examining the color of the anhydrosugar alcohols, preferably as a supercooled melt. Color determination of an anhydrosugar alcohol may be made by comparison of the anhydrosugar alcohol to any known color system.

For example, one such color system is known as the HSB system, in which colors are determined by assigning values that relate to hue, saturation, and brightness. In this system, hue, typically denoted by the symbol H, has values between 0 and 360, with 0 and 360 being identical. For example, reds have values around 0 (or 360), yellows have values of around 60, and so on through the rest of the color spectrum (green, blue, purple, etc,). Combinations of colors, such as orange (red and yellow), have values between the two numbers, for example, between 0 and 60 for orange. Saturation, typically denoted by the symbol S, indicates the intensity of color, and ranges from 0 to 100, with zero being no intensity, indicating a white color. Brightness, denoted by the symbol B, ranges from 0 for black to 100 for white. In the application of this color system to the rating of monomer or polymer color, saturation (S) values close to 0 and brightness (B) values close to 100 are desirable. At a saturation value of zero, hue has no meaning.

For best results, it is preferred to compare the discoloration of supercooled melts of the anhydrosugar alcohol at room temperature. This eliminates color differences which may be caused by the effect of the particle size of a solid. For example, use of crystals or fragments of anhydrosugar alcohol could produce different colors based on sample and particle size due to the amount of light refraction in, or reflection from, the sample. Further, it is desirable to evaluate the color of the anhydrosugar alcohol after it has been subjected to a temperature history similar to that used in polymer synthesis and/or processing in order to determine its usefulness for incorporation in polymers. Therefore, it is preferred that a sample of purified anhydrosugar alcohol be annealed in a clear glass tube at a temperature of at least 260° C., preferably 285° C., for at least four hours, preferably at least eight, then cooled to give a supercooled melt. The annealed anhydrosugar alcohol melt is then compared to a known color chart. The closer the anhydrosugar alcohol is to colorless, the more pure it is.

Alternately, the purified anhydrosugar alcohol can be examined by wavelength transmittance using UV/vis spectroscopy. The wavelength transmittance of the anhydrosugar alcohol is indicative of its coloration, which is at least partially dependent on impurities in the anhydrosugar alcohol. The wavelength transmittance of the anhydrosugar alcohol is determined by UV/vis spectroscopy at specified wavelengths. Because anhydrosugar alcohols are preferably maintained in a crystalline state after purification, spectroscopic measurement is made of anhydrosugar alcohol in a 20% solution of distilled water. The purified anhydrosugar alcohol desirably has UV transmittances when measured in 5 cm cells in a 20% solution of greater than 50% at 224 nm, greater than 65% at 242 nm, greater than 75% at 276 nm, and greater than 85% at 400 nm. Preferably, the percent transmittance is as high as possible.

Color determinations and UV/vis spectroscopy may also be determined on polymers incorporating the purified anhydrosugar alcohol. Whether the purified anhydrosugar alcohol or a polymer incorporating it is examined, the color test is preferred to UV/vis spectroscopy because the examination of the color of the sample utilizes all wavelengths of visible light, thereby providing the full color of the sample as seen by the naked eye. Individual wavelength measurements are not indicative of the total color of the sample, and can be misleading.

By the methods described herein, an anhydrosugar alcohol which is essentially colorless and having a purity of at least 99.0% may be obtained. Preferably, the purity is at least 99.5%, most preferably at least 99.8%. A determination of purity may be made by color determination or UV/vis spectroscopy, as well as other methods known in the art.

The purified anhydrosugar alcohols may be incorporated into polymers, particularly for use in optical grade polymers. For example, a polyester may be formed from an anhydrosugar alcohol, an aliphatic diol such as ethylene glycol and a dicarboxylic acid such as a terephthaloyl moiety, or a dimethyl ester derivative thereof, as demonstrated in applications Ser. Nos. 09/064,844, 09/064,826 and 09/064,720, all filed Apr. 23, 1998, which are each incorporated herein in their entirety by reference. Such polyesters may be used to form commercial products, such as fibers, sheets, films, containers and optical disks, as demonstrated in applications Ser. Nos. 09/064,950, 09/064,846, 09/064,858, 09/064,719 and 09/064,862, all filed Apr. 23, 1998, which are each incorporated in their entirety by reference. In particular, polymers incorporating the anhydrosugar alcohols produced by the process described herein may be formed by polycondensation of the anhydrosugar alcohol with multi-functional containng materials such as polycarboxylic monomers, polycarboxylic acid halides such as acid chloride, polycarbonate monomers such as diphenylcarbonate or phosgene, isocyanates such as toluene diisocyanate and methylene diphenylisocyanate, and dicarboxylic acids, such as terephthaloyl moieties, or dimethyl esters thereof and, optionally, aliphatic diols, such as ethylene glycol.

Examples of the invention described herein are set forth below. These examples are illustrative only and do not encompass the entire scope of the invention, which includes equivalent means and materials as known to one of ordinary skill in the art and as further defined by the disclosure herein and the following claims.

References cited herein are incorporated in their entirety.

EXAMPLES

Purification of Isosorbide

A series of purification experiments were performed using isosorbide as the anhydrosugar alcohol. Temperatures for the dissolution as well as for the recrystallization itself were varied. The concentration of isosorbide in the mother liquors was also varied. Results are shown in Tables 1–3 below. The tables contain a short description of the respective experiment together with purity data determined by differential scanning calorimetry (DSC) and coloration of the samples after annealing at 285° C. for 4 hours.

In particular, the purification experiments were performed using the following general procedures.

Distillation of Isosorbide From Isosorbide

Isosorbide, 1300 g, was placed in a Schlenk flask and was kept at 80° C. for 60 minutes under a dynamic vacuum to remove residual solvent and other volatile impurities. The flask was purged with argon. Sodium borohydride ($NaBH_4$) in an amount of 1.3 g, was added to the flask. The flask was heated to 140° C. The flask was evacuated to approximately 1 mbar pressure and isosorbide was distilled under vacuum.

The procedure is the same for all examples except for the absence of $NaBH_4$ when $NaBH_4$ is not indicated as used.

Recrystallization of Isosorbide from Methanol or Ethanol

Isosorbide, 1400 g, was dissolved in methanol, 600 ml, and allowed to recrystallize overnight in a refrigerator at −18° C. Crystals were collected by filtration and were washed with 600 ml cold (−18° C.) methanol. The washed crystals were dried in vacuo at room temperature. Yield is 850 g (60%).

Recrystallization from ethanol is identical with the substitution of ethanol for methanol.

In most of the recrystallization experiments, seeding crystals were added to the mother liquor to initiate recrystallization of isosorbide.

Annealing Test

Purified isosorbide was placed in a thick walled glass tube. The tube was evacuated and sealed. The tube containing the isosorbide was heated at 285° C. for four hours and cooled. A color value determination was performed.

Color Determination

An estimate of supercooled monomer melt color or polymer chip color was made by comparing the material to two HSB color tables generated on a Hewlett Packard HP-Deskjet® 890C color inkjet printer using the CorelDraw® program. In one table, brightness was held at 100, hue was varied from 25 to 60 in increments of 5, and saturation was varied from 0 to 100 in increments of 10. In the second table, saturation was held at 100, hue was varied from 25 to 60 in increments of 5, and brightness was varied from 0 to 100 in increments of 10. Samples were compared to these tables and the best color match was recorded. Lower numbers for brightness indicate a darker material. Lower numbers for saturation and hue indicate a more colorless material.

UV/vis Spectroscopy

UV/vis spectra was generated on a Perkin Elmer Lambda 9 UV/vis/NIR dual beam spectrometer. Solutions of isosorbide were prepared at 20.0 weight percent in distilled water (Aldrich, Optima grade). Spectra were collected at 960 wavenumbers/min. Isosorbide solutions were measured in a 5 cm quartz cell against a standard of distilled water.

Purity Measurement by Differential Scanning Calorimetry (DSC)

Absolute purity was measured by differential scanning calorimetry according to ASTM E 928-96, which is hereby incorporated by reference. The measurements were made using a DSC7 Differential Scanning Calorimeter from Perkin Elmer.

Abbreviations used in the tables are as follows:

| | |
|---|---|
| A-Isos = | isosorbide produced by the process disclosed in co-pending application CONTINUOUS PROCESS FOR THE PRODUCTION OF ANHYDROSUGAR ALCOHOLS, U.S. Ser. No. 09/___,___ [Atty. Docket No. 032358-019] |
| BuOH = | butanol; |
| C-Isos = | commercially available isosorbide from Cerestar; |
| cold recryst. = | dissolved at maximum 50°, recrystallized at −15°; |
| D = | distillation; |
| dist. = | short column vacuum distilled at 1 mbar; |
| EtOH = | ethanol; |
| EtOAc = | ethyl acetate; |
| hot recryst. = | dissolved under reflux, recrystallized at 25° C.; |
| Isos = | isosorbide; |
| Isos-Ref = | isosorbide (highly purified reference); |
| MeOH = | methanol; |
| (NaBH4) = | addition of NaBH$_4$ to isosorbide prior to vacuum distillation; |
| R = | recrystallization. |

Table 1 demonstrates the level of purity achieved by treatment of commercially available isosorbide with various purification methods, including those disclosed herein. As can be seen from the results, the highest level of purity is attained when a combination of recrystallization and distillation is used, wherein the recrystallization is from methanol or ethanol, or where multiple distillations are performed, as in the sample designated Isos-Ref.

TABLE 1

Purity of Anhydrosugar Alcohol Isosorbide

| Experiment | Purity (DSC) |
|---|---|
| Isos-Ref* | 99.95 |
| C-Isos | 98.79 |
| C-Isos 1 × recryst. MeOH cold (standard: 70% solution) | 99.20 |
| C-Isos 2 × recryst. MeOH cold | 99.35 |
| C-Isos 1 × recryst. MeOH hot (saturated hot solution) | 98.95 |
| C-Isos 1 × recryst. EtOH cold (standard: 50% solution) | 99.25 |
| C-Isos 1 × recryst. EtOH hot (saturated hot solution) | 98.77 |
| C-Isos 1 × recryst. EtOH hot (saturated hot solution), crystals washed | 99.54 |
| C-Isos 1 × recryst. isopropanol hot (saturated hot solution) | 99.65 |
| C-Isos 1 × recryst. acetone cold (standard: 40% solution) | 99.92 |
| C-Isos 1 × recryst. acetone hot (saturated hot solution) | 99.81 |
| C-Isos 1 × recryst. THF cold (standard: 50% solution) | 99.72 |
| C-Isos 1 × recryst. THF hot (saturated hot solution) | 99.63 |
| C-Isos 1 × recryst. BuOH hot (saturated hot solution) | 96.40 |
| C-Isos 1 × recryst. BuOH/MeOH (80/20) (saturated hot solution) | 98.45 |
| C-Isos 1 × dist. | 98.66 |
| C-Isos 1 × dist (NaBH$_4$) | 99.07 |
| C-Isos 1 × recryst. MeOH cold, 1 × dist. | 99.94 |
| C-Isos 1 × recryst. MeOH cold, 1 × dist. (NaBH$_4$) | 99.85 |
| C-Isos 1 × dist. (NaBH$_4$), 1 × recryst. MeOH cold | 99.10 |

*The reference sample is an extremely pure sample of isosorbide that was prepared by the inventors herein by multiple distillations as described above to ensure a high degree of purity. Annealing at 300° C. produced a clear solution.

Table 2 provides the purity, after purification by various methods, of commercially available isosorbide and isosorbide produced by the process disclosed in co-pending application CONTINUOUS PROCESS FOR THE PRODUCTION OF ANHYDROSUGAR ALCOHOLS, [Atty. Docket No. 032358-019] (A-Isos), filed on the same day herewith and incorporated herein by, reference. As can be seen from the table, the best results were obtained by the combination of distillation followed by recrystallization from methanol or ethanol. These examples have the lowest saturation (10) and higher levels of transmittance at each UV wavelength tested than the commercially available product.

TABLE 2

Purity of Isosorbide As Measured by UV Transmittance
and Color of Polymer Incorporating Purified Isosorbide

| Experiment | Isosorbide UV Percent Transmittance 20 wt % solution, 5 cm cell | | | | Polymer* Color Evaluation | | |
|---|---|---|---|---|---|---|---|
| | 224 | 242 | 276 | 400 | H | S | B |
| C-Isos(as received) | 0.2 | 1.1 | 10.1 | 83.9 | 45 | 30 | 100 |
| C-Isos 2xR (MeOH) | 29.4 | 60.1 | 69.3 | 93.8 | 55 | 20 | 100 |
| C-Isos 1xR (MeOH) 1xD (NaBH$_4$) | 1.6 | 24.7 | 46.6 | 83.4 | 45 | 100 | 70 |
| C-Isos 1xD (NaBH$_4$) 1xR(MeOH) | 5.6 | 57.0 | 73.8 | 95.9 | 50 | 10 | 100 |
| C-Isos 1xR (EtOAc) 1xD | 2.6 | 18.2 | 26.8 | 70.6 | 40 | 40 | 100 |
| C-Isos 1xR (EtOAc) 1xD 1xR (MeOH) | 75.2 | 84.1 | 92.9 | 97.9 | 50 | 10 | 100 |
| C-Isos 1xR (EtOAc) 1xD 1xR (EtOH) | 53.7 | 68.2 | 75.9 | 89.9 | 55 | 10 | 100 |
| A-Isos 1xD 1xR (MeOH) | 23.6 | 41.2 | 59.6 | 93.3 | 50 | 10 | 100 |

*Polymer formed by melt polymerization of ethylene glycol, isosorbide and terephthaloyl moiety.

Table 3 demonstrates the effect of heating purified isosorbide to the temperature required for annealing a polymer. This indicates whether the purified monomer may develop color during polymerization or remain clear. As can be seen from the results of Table 3, a combination of recrystallization from methanol or ethanol and distillation results in a clear monomer upon annealing, indicating a good result if used to form polymers.

TABLE 3

Color of High Temperature Annealing Purified Isosorbide

| Experiment | Annealed Isosorbide Color Evaluation | | |
|---|---|---|---|
| | H | S | B |
| C-Isos (as received) | 50 | 40 | 100 |
| C-Isos 1 × R (MeOH) | 55 | 10 | 100 |
| C-Isos 1 × R (EtOH) | 55 | 20 | 100 |
| C-Isos 1 × D | 55 | 20 | 100 |
| C-Isos 1 × D (NaBH$_4$) | 55 | 10 | 100 |
| C-Isos 1 × R (MeOH) 1 × D | — | 0 | 100 |
| C-Isos 1 × R (MeOH) 1 × D (NaBH$_4$) | — | 0 | 100 |
| C-Isos 1 × D 1 × R (MeOH) | — | 0 | 100 |
| C-Isos 1 × D (NaBH$_4$) 1 × R (MeOH) | — | 0 | 100 |
| A-Isos 1 × D | 55 | 20 | 100 |
| A-Isos 1 × D 1 × R (MeOH) | — | 0 | 100 |

It should be noted that a clear correlation between analytical data concerning the purity of purified isosorbide and the discoloration observed on the HSB scale for purified isosorbide after annealing to 285° C. can not be made in all cases. This is most probably due to the fact that even trace amounts of impurities may be responsible for the discoloration phenomenon.

Purification of isosorbide performed only by vacuum distillation desirably includes the addition of NaBH$_4$ to obtain good results, as shown in the above tables. However, no NaBH$_4$ is required when applying a combination of distillation and recrystallization.

A combination of distillation followed by recrystallization was found to produce the best results concerning purity and coloration of isosorbide.

What is claimed is:

1. A process for obtaining a purified anhydrosugar alcohol comprising:
    dissolving an anhydrosugar alcohol in a lower aliphatic alcohol to form a solution;
    cooling said solution to a temperature sufficient to form crystals of said purified anhydrosugar alcohol; and
    separating said crystals of said purified anhydrosugar alcohol from said solution.

2. The process of claim 1, wherein the lower aliphatic alcohol is methanol, ethanol or ethylene glycol.

3. The process of claim 1, further comprising distilling the anhydrosugar alcohol.

4. The process of claim 3, wherein the anhydrosugar alcohol is distilled in the presence of borohydride ions.

5. The process of claim 4, wherein the borohydride ions are sodium borohydride.

6. The process of claim 3, wherein the anhydrosugar alcohol is distilled, then recrystallized.

7. The purified anhydrosugar alcohol produced by the process of claim 1, said purified anhydrosugar alcohol having a purity greater than 99.8%.

8. A process for the purification of anhydrosugar alcohols comprising:
    distilling said anhydrosugar alcohol; and
    melt recrystallizing said anhydrosugar alcohol to obtain an anhydrosugar alcohol having a purity of at least 99.0%.

9. The process of claim 8, wherein the anhydrosugar alcohol is distilled in the presence of borohydride ions.

10. The process of claim 9, wherein the borohydride ions are sodium borohydride.

11. The process of claim 8, wherein the anhydrosugar alcohol is distilled, then melt recrystallized.

12. A purified anhydrosugar alcohol, produced by the process of claim 8, said purified anhydrosugar alcohol having a purity of at least 99.8%.

13. A purified anhydrosugar alcohol having a purity of at least 99.0%.

14. The purified anhydrosugar alcohol of claim 13, having a purity of at least 99.8%.

15. The purified anhydrosugar alcohol of claim 13, wherein the purified anhydrosugar alcohol is colorless after annealing at a temperature of at least 260° C. for four hours.

16. A polymer comprising the purified anhydrosugar alcohol of claim 13.

17. The polymer of claim 16, wherein the polymer is formed by melt condensation.

18. The polymer of claim 16, further comprising a dicarboxylic acid and an aliphatic diol.

19. The polymer of claim 18, wherein the aliphatic diol is ethylene glycol.

20. The polymer of claim 18, wherein the dicarboxylic acid is a terephthaloyl moiety.

21. A product formed from the polymer of claim 16.

22. The product of claim 21, selected from the group consisting of a fiber, an optical disk, a container, a sheet and a film.

23. A method for making a polyester polymer comprising:
    (1) combining in a reactor a monomer comprising a terephthaloyl moiety; optionally, one or more other monomers containing an aromatic diacid moiety; a monomer comprising an ethylene glycol moiety; a monomer comprising the purified anhydrosugar alcohol of claim 13; optionally, one or more other monomers comprising a diol moiety; and optionally, a monomer comprising a diethylene glycol moiety, with a condensation catalyst suitable for condensing aromatic diacids and glycols; and (2) heating said monomers and said catalyst to a temperature sufficient to polymerize said monomers into a polyester polymer having at least terephthaloyl moieties, ethylene glycol moieties and isosorbide moieties;

wherein said heating is continued for a sufficient time to yield an isotropic polyester having an inherent viscosity of at least about 0.35 dL/g when measured as a 1% (weight/volume) solution of said polyester in o-chlorophenol at a temperature of 25° C.

24. The method of claim 23, wherein the purified anhydrosugar alcohol is isosorbide.

25. An isotropic polyester comprising terephthaloyl moieties; optionally, other aromatic diacid moieties; ethylene glycol moieties; diethylene glycol moieties; the purified anhydrosugar alcohol of claim 13; and, optionally, one or more other diol moieties, wherein said polyester has an inherent viscosity of at least about 0.35 dL/g when measured as a 1% (weight/volume) solution of said polyester in o-chlorophenol at a temperature of 25° C.

26. The isotropic polyester of claim 25, wherein the purified anhydrosugar alcohol is isosorbide.

27. An isotropic polyester comprising terephthaloyl moieties; optionally, other aromatic diacid moieties; ethylene glycol moieties; optionally, diethylene glycol moieties; the purified anhydrosugar alcohol of claim 13; and optionally, one or more other diol moieties, wherein said polyester has an inherent viscosity of at least about 0.5 dL/g when measured as a 1% (weight/volume) solution of said polyester in o-chlorophenol at a temperature of 25° C.

28. The isotropic polyester according to claim 27, wherein the purified anhydrosugar alcohol is isosorbide.

* * * * *